June 4, 1968 D. SILVERMAN 3,387,294

RAPID LOADING MAGNETIC TAPE RECORDING SYSTEM

Filed Jan. 22, 1965 3 Sheets-Sheet 1

DANIEL SILVERMAN
*INVENTOR*

BY Buell B. Hamilton

ATTORNEY

RAPID LOADING MAGNETIC TAPE RECORDING SYSTEM

Filed Jan. 22, 1965 3 Sheets-Sheet 2

DANIEL SILVERMAN
*INVENTOR*

BY Buell B. Hamilton

ATTORNEY

DANIEL SILVERMAN
*INVENTOR*

BY Buell B. Hamilton

ATTORNEY

United States Patent Office 3,387,294

Patented June 4, 1968

3,387,294
RAPID LOADING MAGNETIC TAPE RECORDING SYSTEM

Daniel Silverman, Tulsa, Okla., assignor to Pan American Petroleum Corporation, Tulsa, Okla., a corporation of Delaware Filed Jan. 22, 1965, Ser. No. 427,378
10 Claims. (Cl. 340—174.1)

ABSTRACT OF THE DISCLOSURE

This invention is concerned with the recording and reading of magnetic records on the flexible magnetic tape in which there is a plurality of parallel recording tracks across the tape. The tape is placed around the surface of a rotating cylindrical drum. It is held to the drum (which has a porous outer surface) by differential air pressure outside over inside of the surface.

The tape must be precisely positioned longitudinally with respect to the drum surface, and precisely aligned laterally. The tape is prepositioned with respect to the drum on a shelf adjacent the drum and is picked up by the rotating drum by means of retractable pins in the drum surface cooperating with precisely punched holes in the leading edge of the tape. A row of circumferentially placed pins on the drum surface cooperating with a longitudinal row of punched holes in the tape provides precise lateral alignment of the tape with respect to the drum. Means are provided to press the tape into intimate contact with the drum surface so that the differential pressure can hold it. The tape is released from the drum by removing or reversing the differential pressure across the circumferential surface of the drum.

This invention relates to handling magnetically recorded data. More particularly, it relates to methods and apparatus for playing back seismic data recorded on magnetic tape.

In one of the more widely used systems of playing back seismic data on short magnetic tapes, each tape is separately placed around a drum. The drum is then rotated to cause the magnetic record to pass a bank of playback heads and the tape is then removed from the drum. This requires one revolution to mount the tape, one to read the tape and one to remove the tape. A three-fold speed advantage could be gained without any greater load or wear on the equipment if the drum could be loaded, read and unloaded in one revolution. Of course, the same speed advantage can be had if the tape is used in a recording operation, instead of in a playback operation. These tapes are called short tapes, usully 2 to 4 feet long, to distinguish them from longer tapes used with digital computers, for example.

An object of this invention is to provide a method and apparatus for handling magnetically recorded data. A more specific object is to provide a method and apparatus for loading, reading or recording and unloading a short magnetic tape in one rotation of a drum. Another object is to hold the tape more securely to the drum to avoid stretching or movement of the tape during recording and playback operations. Still other objects will be apparent to those skilled in the art from the following description and claims.

In general, I accomplish the objects of my invention by the use of a tape-holding drum through the surface of which a vacuum can be applied during a part of the rotation and a pressure can be applied during another part of the rotation.

Figure 1:
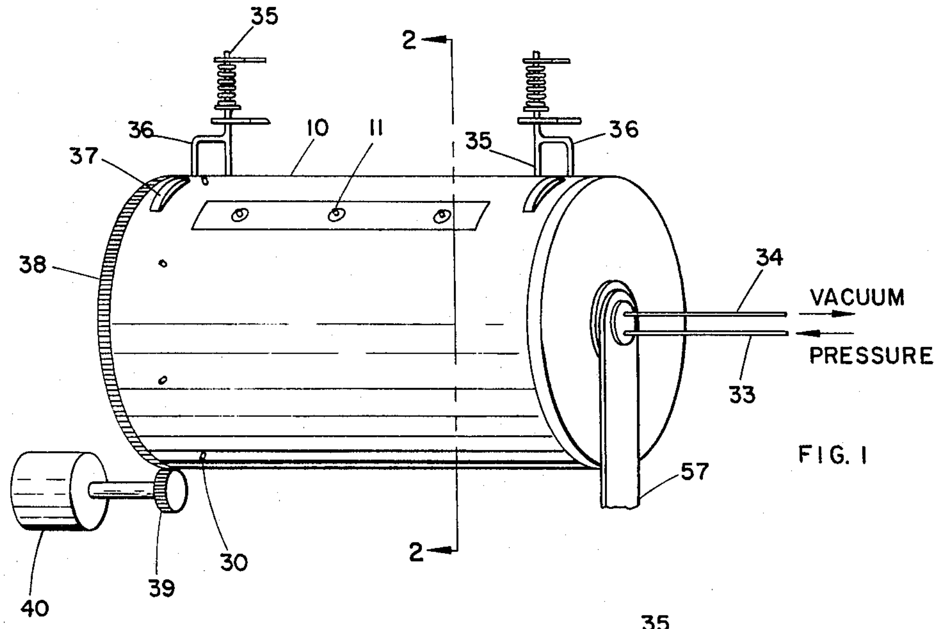
Figure 2:
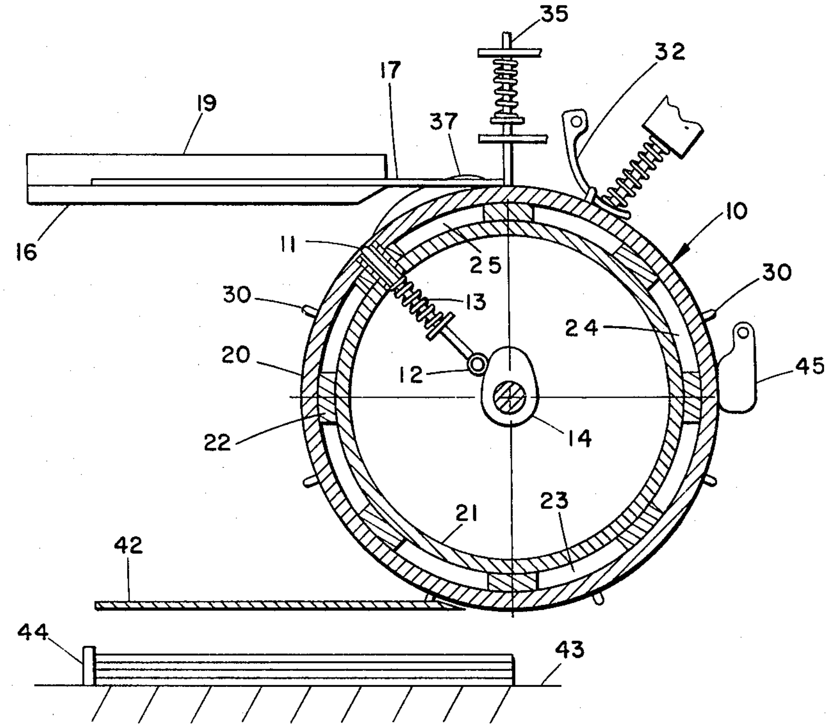
Figure 3:
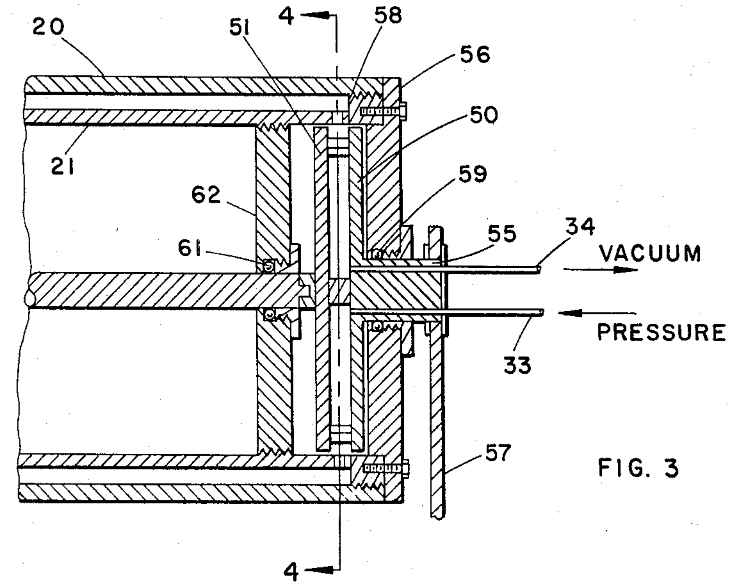
Figure 4:
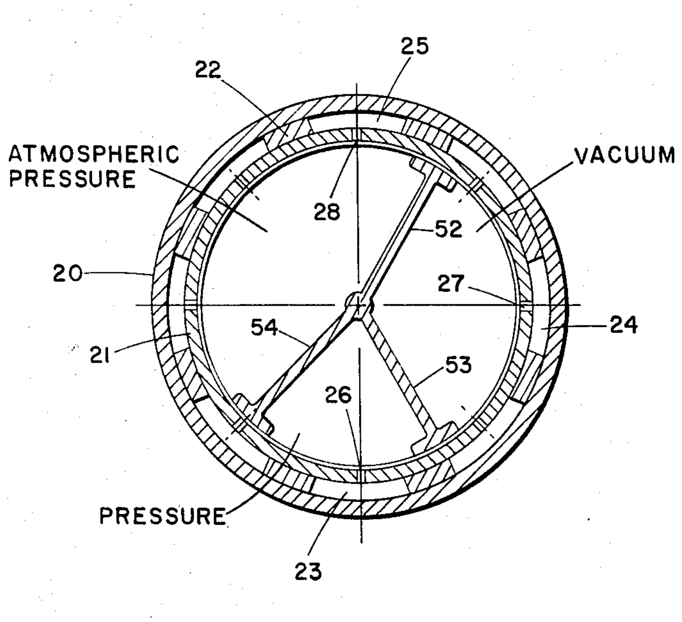
Figure 6:
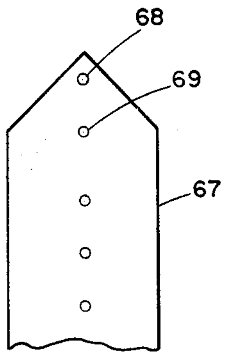
Figure 5:
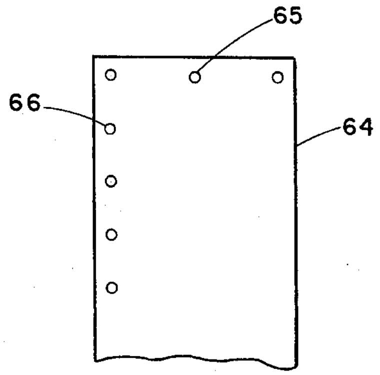
Figure 7:
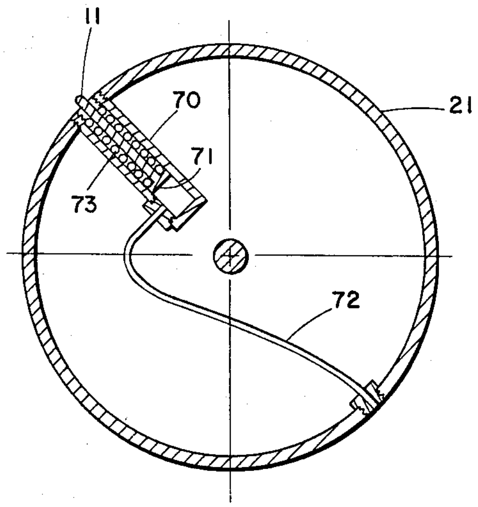

The apparatus is shown in the drawing in which FIGURE 1 is an isometric view of the apparatus. FIGURE 2 is a plane view of a section indicated by line 2—2, looking in the direction of the arrows. FIGURE 3 is a plane view of a section along the axis of the drum at the right end of FIGURE 1. FIGURE 4 is a plane view of a section of the drum indicated in FIGURE 3 by line 4—4, looking in the direction of the arrows. FIGURE 5 is a view of the type of tape, having a square end, which is probably the most commonly used type. FIGURE 6 is a view of another type of tape with a pointed end which is also widely used. FIGURE 7 shows an alternative apparatus for extending and retracting a pin through the surface of the drum.

Considering the drawing in more detail, it will be more convenient to consider FIGURE 2 first. In this figure drum 10 is the drum around which the tape is wrapped, pins 11 cooperate with punched openings 65 (FIGURE 5) in the leading edge of magnetic tape 17. These pins fix the circumferential position of the tape with respect to the drum. There are also pins 30 along the edge of the drum which cooperate with holes or slots 66 (FIGURE 5) on the edge of the tape to align the tape in transverse direction with respect to the ends of the drum. Playback heads 45 press against the drum surface. Pins 11 are retracted or extended as roller 12 moves along the stationary surface of cam 14. Spring 13 keeps roller 12 in contact with the surface of cam 14. Pressure arms 32 are provided to smooth the tape on the surface of the drum, prevent wrinkling and to facilitate attachment of the tape to the drum. These arms should be lined up in the spaces between the pins 11 or at least be placed near the top of the drum so that the pins 11 remain in their extended positions until the arms 32 can press the tape into contact with the drum.

The drum is made up of an outer permeable shell 20, an inner impermeable shell 21 and impermeable spacer bars 22 running the length of the drum. Bars 22 separate the space between the shells into different chambers, such as 23, 24 and 25. As shown in FIGURE 4, either superatmospheric pressure, vacuum, or atmospheric pressure can be applied to chambers 23, 24 and 25 through openings 26, 27 and 28, respectively, in the inner shell 21. As shown in FIGURES 1 and 3, the pressure and vacuum are applied to their respective chambers in the drum through conduits 33 and 34 respectively. A conduit for atmospheric pressure may also be provided if desired, but is not ordinarily necessary since a part of the surface of the drum is usually uncovered so pressure equalizes across the permeable shell 20 to establish atmospheric pressure below this uncovered part of the surface.

Returning to FIGURE 2, tape 17 rests on table 16. The tape can be pushed forward until it contacts pins 35. These pins position the end of the tape so as drum 10 rotates, pins 11 enter holes 65 (FIGURE 5) near the end of the tape.

The most important aligning operation is taken care of by pins 30. It is essential that the tape not be allowed to run obliquely past pickup heads 45. The reason is that relative timing of the various magnetic traces on the tape is important to one-thousandth second or less. Since the tapes are wide, a very slight oblique position of the tape can cause the timing of traces on opposite edges of the tape to differ by several thousandths of a second. The aligning action of the row of holes on the front end of the tape when engaged by pins 11, ordinarily is not sufficient to prevent a slight amount of oblique running of the tapes. Therefore, holes or slots are punched in at least one column down at least one side of the tape or in an intermediate position. These slots fit over pins 30 to give the degree of transverse aligning which is necessary. The aligning action of pins 11 is adequate to cause the slots along the edge of the tape to fit over pins 30, particularly if pins 30 are tapered slightly from small at the top to large at the bottom. It may also be advisable to provide a guide 19 on table 16 to give the tapes an initial transverse alignment on the drum so the pins 30 will fit into the corresponding slots along the sides of the tape.

Pins 35 have side arms 36 which are contacted by cams 37 as the drum rotates. This is shown best in FIGURE 1. These cams are located near the ends of the drum beyond the edges of the tape. The cams serve to lift pins 35 by means of arms 36 to permit forward movement of the tape around the drum when pins 11 engage the correspondent holes 65 in tape 17. FIGURE 1 also shows how drum 10 is turned by means of gear 38 which is driven by mating gear 39 which, in turn, is driven by motor 40.

A blade 42 is provided, as shown in FIGURE 2, to aid in separating the tape from the drum so it can be stacked on surface 43 against stop 44.

In FIGURE 3 a distributing system is shown for applying a superatmospheric pressure, a vacuum or atmospheric pressure to the various chambers beneath the outer permeable shell 20 of the drum. This system includes two discs 50 and 51 spaced apart by dividing elements 52, 53 and 54 shown in FIGURE 4. These dividing elements are attached to discs 50 and 51 as by welding, for example, to maintain the discs in fixed relation to each other. Disc 50 has a cylindrical portion 55 passing through end plate 56 of the drum. This cylindrical portion 55 is attached to a support 57 which not only supports this end of the drum, but also prevents turning of discs 50 and 51.

End plate 56 is held against the end of the drum by attachment to ring 58 which, in turn, is secured to outer shell 20 of the drum. A bearing assembly 59 is provided between end plate 56 and cylinder 55. Another bearing assembly 61 is provided at the other end of the distributing assembly. This bearing is held in place by a support 62 secured to the inner shell 21 of the drum. The two bearings 59 and 61 center discs 50 and 51 so clearance between these discs and ring 58 and shell 21 respectively is very small, preventing excessive loss of vacuum or pressure in the vacuum and pressure sections of the distributor.

In operation, the drum is rotated by motor 40. Tape 17 is held against guide 19 on table 16 and is pushed forward until it is stopped by pins 35. As roller 12 moves along the surface of stationary cam 14 in a clockwise direction, pins 11 are extended above the surface of the drum and engage holes 65 in the leading edge of the tape. At the same time, clockwise rotation of the drum causes cams 37 to lift pins 35 so pins 11 can pick up the tape and move it around the drum. As the tape moves around the drum, pins 30 engage slot 66 in the edge of the tape and align the tape transversely on the drum. Arms 32 press the tape against the surface of the drum at a point just before the tape reaches a region where vacuum is applied below the surface of the drum. The application of vacuum holds the tape firmly to the surface of the drum as the tape passes pickup heads 45 and progresses around to the bottom of the drum. Cam 14 is shaped so that pins 11 are retracted before they reach the pickup heads. At the bottom of the drum the tape reaches a zone where a positive super-atmospheric pressure is applied below the permeable surface of the drum. This pressure blows the film loose from the drum. The film is separated from the drum by pressure and blade 42 and falls onto surface 43. Thus, in a single rotation of the drum the tape is picked up, aligned, held tightly against the drum surface while it is read and then is discharged from the drum.

The outer cylindrical shell of the drum is preferably made of permeable ceramic, such as porcelain; a sintered non-magnetic metal, such as bronze; or possibly some other permeable material, such as one of the cermets. The drum surface may also be made of impermeable metal, such as aluminum, having small holes or circumferential slots preferably located so they pass between pickup heads so the holes or slots will not interfere with the pickup of signals from the record by the heads. It will be understood that when reference is made to the drum wall being made of a permeable material, this is intended to include naturally impermeable materials such as aluminum sheet, perforated by holes or slots as well as naturally permeable materials.

While the apparatus shown in the drawing and the method and apparatus described above are preferred, it will be apparent that many variations are possible. For example, while use of a vacuum inside the drum wall has been described, the important factor is differential pressure across the wall of the drum, the pressure outside being greater than that inside the wall. Thus, the pressure inside could actually be above atmospheric pressure as long as the pressure outside was even greater. At the bottom of the drum the differential pressure is reversed, or at least equalized or released.

Use of the differential pressures makes possible placing the tape on the bottom of the drum and removing it at the top, if desired. It is even possible to rotate the drum about a vertical axis rather than about a horizontal axis as shown.

The use of a differential pressure is most useful in a method in which the tape is mounted on the drum, read and discharged all in one rotation of the drum. It is also useful, however, even if several rotations of the drum are contemplated. For example, a single tape may be played back several times with different locations of playback heads. In such cases it may be advisable to apply a vacuum to all the chambers below the surface of outer shell 20 to hold the tape securely to the drum surface during several rotations of the drum. The differential pressure can then be released to release the tape for removal, or the differential pressure can be reversed to actively discharge the tape from the drum. Such operations require, of course, a conduit into each of the three divisions of space between discs 50 and 51. If vacuum is applied to the entire drum surface, the tape should be substantially as long as the circumference of the drum to avoid excessive leakage of air through the uncovered portions of the drum. As an alternative, a short piece of plain tape, plastic film or the like can be used to cover the drum surface not to be covered by the record tape.

Many systems other than that shown in the drawing have been described in the past for applying a vacuum to a part of a rotating cylinder and a pressure to another part. Some of these are shown and described, for example, on pages 75 to 79 in section 19 of the 4th edition of Perry's Chemical Engineers' Handbook, published by McGraw-Hill Book Company, Inc., New York.

The pins have been described as cooperating with holes or slots in the tape to align the tape on the drum. It will be apparent, however, that the same pins can be used with an unperforated tape to align the tape. It is only necessary to provide straight tape sides and ends. Then, an end is placed against pins 11 while a side is placed against pins 30. Since the differential pressure holds the tape securely against the drum surface, the pins are not needed for this purpose, but only for making an initial alignment. Other aligning means such as shoulders on the surface of the drum can be used if desired. In view of the need for almost perfect alignment, however, the use of holes and slots in the tapes cooperating with pins on the drum as described above is greatly preferred.

For best results, the drum should turn as freely as possible. The actuation of pin 11 by cam 14 restricts, to some small extent, free movement of the drum. It may be desirable, therefore, to operate pin 11 by pneumatic means such as that shown in FIGURE 7. In this apparatus pin 11 is extended by pressure acting below piston 71 in cylinder 70. The pressure is applied through tube 72 from a chamber on the opposite side of the drum. Thus, as pins 11 approach the top of the drum, the chamber into which tube 72 leads reaches the zone in which pressure is applied to the chambers. This pressure is applied through tube 72 to piston 71 to extend pins 11. As the drum rotates, pins 11 pass arms 32 which press the tape down onto the drum where the drum is held by vacuum. A little later the chamber opposite pins 11 is exposed to atmospheric pressure permitting springs 73 to retract pins 11 before they reach pickup heads 45. In this system no drag is present to resist rotation of the drum. Still other means for extending and retracting pins 11 will occur to those skilled in the art.

The retractable pins are desirable for use with square-end tapes shown in FIGURE 5. In pointed-end tapes 67 as shown in FIGURE 6 only a single pin 11 is required to engage opening 68 in the pointed end of the tape. In this tape transverse aligning slots 69 are along the middle of the tape. The magnetic traces are along each side of this line of slots. Therefore, there are no pickup heads at the middle of the tape so pin 11 can be a fixed unretractable pin. This pointed-end tape can be handled on the drum in much the same way as the square-end tapes. The principal difference is that the position of pins 35 must be changed to stop the tape in a position where the center pin will engage opening 68 and pull the tape onto the drum as the drum rotates.

To this point use of the equipment for playing back records on tapes has been described. It is often desirable, particularly at playback centers, to re-record traces with various modifications. It will be apparent that my apparatus can be used for this purpose by replacing the pickup or playback heads with recording heads. It may be best to use transducer heads which can perform both functions. While the apparatus is particularly advantageous for playback center use, it can also be used in the field, if desired, both for recording and playback.

Still other alternates and variations than those described above will be apparent to those skilled in the art. Therefore, I do not wish to be limited to the examples given above, but only by the scope of the following claims.

I claim:

1. Apparatus for recording and reading a magnetic record on a short flexible tape comprising a drum, the outer cylindrical wall of which is permeable and is made of a non-magnetic material, means on said drum cooperating with means on said tape for temporarily and releasably connecting said tape to said drum in precise longitudinal alignment of said tape to said drum, means on said drum cooperating with means on said tape for precise lateral alignment of said tape to said drum, a transducer head adjacent the cylindrical surface of said drum to record and read the magnetic record on said tape, means for rotating said drum so its cylindrical surface moves past said transducer head, means for applying a differential pressure across the permeable cylindrical wall of said drum, the pressure outside being greater than the pressure inside to hold said tape securely to the surface of said drum as it moves past said transducer head, and means for releasing said differential pressure across the wall of said drum to release the tape from said drum.

2. The apparatus of claim 1 in which said means on said drum for precise longitudinal alignment of said tape to said drum includes at least one retractable pin which engages at least one hole in the leading end of said tape.

3. The apparatus of claim 1, including means for pressing said tape into intimate contact with the surface of said drum.

4. Apparatus as in claim 1, including means separate from said drum for rough alignment of said tape with respect to said drum.

5. Apparatus for recording and reading a magnetic record on a flexible tape comprising a drum, the outer cylindrical wall of which is permeable and is made of a non-magnetic material, means on said drum cooperating with means on said tape for temporarily and releasably connecting said tape to said drum in precise longitudinal alignment of said tape to said drum, means on said drum cooperating with means on said tape for precise lateral alignment of said tape to said drum, a transducer head adjacent the cylindrical surface of said drum in operative relation to said tape to record and read the magnetic record on said tape, means for rotating said drum so its cylindrical surface moves past said transducer head, means for applying a differential pressure across the permeable cylindrical wall of said drum, the pressure outside being greater than the pressure inside to hold said tape securely to the surface of said drum as it moves past said transducer head, and means for reversing said differential pressure across the wall of said drum to discharge said tape from said drum.

6. Apparatus for recording and reading a magnetic record on a flexible tape comprising a drum, the outer cylindrical wall of which is permeable and is made of a non-magnetic material, means on said drum cooperating with means on said tape for temporarily and releasably connecting said tape to said drum in precise longitudinal alignment of said tape to said drum, means on said drum cooperating with means on said tape for precise lateral alignment of said tape to said drum, a transducer head adjacent the cylindrical surface of said drum to record and read the magnetic record on said tape, means for rotating said drum so its cylindrical surface moves past said transducer head, means for applying a differential pressure across the portion of the cylindrical wall moving past said transducer head, the pressure outside said drum being greater than the pressure inside said drum opposite said transducer head to hold said tape securely to the drum surface at this first location, and means for applying a greater pressure inside than outside the portion of said cylindrical wall of said drum moving past another position in the path of rotation of the wall of said drum to discharge said tape from the surface of said drum at this second location, whereby said tape can be mounted on said drum, read and discharged in a single rotation of said drum.

7. A method for recording and reading a magnetic record on a flexible tape comprising, (1) rough positioning said tape with respect to the circumferential surface of a cylindrical drum the outer cylindrical wall of which is permeable and is made of a non-magnetic material, (2) rotating said drum, (3) releasably connecting said rough-positioned tape to said drum in precise longitudinal alignment of said tape to said drum, (4) aligning said tape on said surface in precise lateral position with respect to said surface, (5) applying a higher pressure outside the cylindrical wall of said drum than inside said wall to secure said tape to the surface of said drum, (6) positioning a transducer head adjacent the circumferential surface of said drum for recording and reading the record on said tape, (7) and equalizing the pressures outside and inside said drum wall to release said tape from said drum.

8. The method as in claim 7 including the step, between steps 4 and 5, of pressing said tape into contact with said surface.

9. A method for recording and reading a magnetic record on a flexible tape comprising, (1) rough positioning said tape with respect to the circumferential surface of a cylindrical drum the cylindrical wall of which is permeable and is made of a non-magnetic material, (2) rotating said drum, (3) releasably connecting said rough-positioned tape to said drum in precise longitudinal alignment of said tape to said drum, (4) aligning said tape on said surface in precise lateral position with respect to said surface, (5) applying a higher pressure outside the cylindrical wall of said drum than inside said wall to secure said tape to the surface of said drum, (6) positioning a transducer head adjacent the circumferential surface of said drum for recording and reading the record on said tape, (7) and applying a higher pressure inside said cylindrical drum wall than outside said wall to discharge said tape from said drum.

10. A method for recording and reading a magnetic record on a flexible tape comprising, (1) rough positioning said tape with respect to the circumferential surface of a cylindrical drum, the cylindrical wall of said drum being permeable and made of a non-magnetic material, (2) rotating said drum, (3) releasably connecting said rough-positioned tape to said drum in precise longitudinal alignment of said tape to said drum, (4) aligning said tape on said surface in precise lateral position with respect to said surface, (5) positioning a transducer head adjacent the circumferential surface of said drum for recording and reading the record on said tape, (6) applying a higher pressure outside than inside the portion of the cylindrical wall moving past said transducer head, thus holding the tape securely to the drum surface at this location, (7) and applying a higher pressure inside than outside a portion of the cylindrical wall which has passed said transducer head, to discharge said tape from said drum.

References Cited

UNITED STATES PATENTS

| | | | |
|---|---|---|---|
| 3,302,829 | 2/1967 | Wilmer | 340—174.1 |
| 3,291,133 | 12/1966 | Glaser et al. | 129—16.1 |
| 2,722,676 | 11/1955 | Begun | 340—174.1 |

BERNARD KONICK, *Primary Examiner.*

A. I. NEUSTADT, *Assistant Examiner.*